United States Patent [19]
Kushibe et al.

[11] Patent Number: 4,948,358
[45] Date of Patent: Aug. 14, 1990

[54] DIE CLAMPING APPARATUS

[75] Inventors: Yuki Kushibe; Hiroshi Sato, both of Nagoya, Japan

[73] Assignee: Mitsubishi Jukogyo Kabushiki Kaisha, Tokyo, Japan

[21] Appl. No.: 396,767

[22] Filed: Aug. 18, 1989

Related U.S. Application Data

[63] Continuation of Ser. No. 235,969, Aug. 24, 1988, abandoned.

[30] Foreign Application Priority Data

Sep. 11, 1987 [JP] Japan ................... 62-226408
Sep. 29, 1987 [JP] Japan ................... 62-245600

[51] Int. Cl.$^5$ ............................. B29C 45/66
[52] U.S. Cl. ..................... 425/574; 100/258 R; 100/258 A; 425/575; 425/589
[58] Field of Search .................. 100/258 R, 258 A; 425/150, 406, 574, 575, 589, 590, 595

[56] References Cited

U.S. PATENT DOCUMENTS 3,156,014 11/1964 Wenger .................. 425/589
3,346,924 10/1967 Lombard ................. 425/595
3,801,256 4/1974 Farrell .................. 425/595
4,341,511 7/1982 Laurant et al. ........... 425/150
4,500,274 2/1985 Cyriax et al. ............ 425/185

FOREIGN PATENT DOCUMENTS 258499 11/1967 Austria .
2042259 8/1971 Fed. Rep. of Germany .
3215567 10/1983 Fed. Rep. of Germany .
2425321 12/1979 France .
427074 3/1942 Japan .
1304305 1/1973 United Kingdom .

Primary Examiner—Jay H. Woo
Assistant Examiner—Timothy W. Heitbrink
Attorney, Agent, or Firm—Wenderoth, Lind & Ponack

[57] ABSTRACT

A die clamping apparatus includes a fixed die plate for holding a fixed die, a movable die plate for holding a movable die, and structure for actuating the movable die plate to advance or retreat with respect to the fixed die plate. Tie bars for performing a die clamping operation can be fixedly coupled to the fixed die plate after the movable die plate has approached to the fixed die plate and the fixed die and the movable die have closed form a mold. A movable die plate main body and guides for guiding advance/retreat movements and on which the movable die plate is mounted are separately formed and are pin-coupled so as to be mutually rotatable.

6 Claims, 12 Drawing Sheets

DIE CLAMPING APPARATUS

This application is a continuation of now abandoned application, Ser. No. 07/235,969, filed Aug. 24, 1988.

BACKGROUND OF THE INVENTION

1. Field of the Invention:

The present invention relates to a die clamping apparatus that is applicable to an injection molding machine, a press machine, a die casting machine, etc.

2. Description of the Prior Art:

One example of a die clamping apparatus in the prior art is shown in FIGS. 16 to 19.

In these figures, reference numeral 1 designates a fixed die plate, numeral 2 designates tie bars, numeral 3 designates a fastening side fixed panel, numeral 4 designates a die clamping cylinder, numeral 5 designates a base, numeral 6 designates a movable die plate, and as a result of actuation of the die clamping cylinder 4 the movable die plate 6 moves on the base 5. The movable die plate 6 has the configuration shown in the figures, and it is supported from liners 20 laid on the base 5 via rollers 7 provided at the bottom of die plate 6 without being suspended by the tie bars 2.

In addition, in the lower portion of the movable die plate 6 is formed a recess 8 defined by a bottom surface inclined in the direction of movement as shown in FIG. 18, and in this recess 8 is fitted an adjustor block 9 carrying the above-mentioned rollers 7 and provided with an inclined surface having the same gradient as the aforementioned bottom surface so as to be held in contact therewith, with appropriate gaps or spaces maintained between the adjustor block 9 and the opposite end walls of the recess 8. Furthermore, adjacent the opposite end surfaces of the adjustor block are provided adjusting bolts 10 and 11 respectively penetrating through the opposite end walls of the recess, so that the position of the adjustor block 9 may be adjusted by bolts 10 and 11, and as a result, the height of the movable die plate 6 may be finely adjusted. Reference numerals 12 and 13 designate adjusting nuts respectively mated with the bolts 10 and 11.

On the other hand, on the opposite side surfaces of the lower portion of the movable die plate 6 are disposed adjustor blocks 14 and 15, respectively, which are mounted to the side surfaces via mutually inclined contact surfaces as best seen in FIG. 19, and guide rollers 16 and 17 rotatably supported by adjustor blocks 14 and 15, respectively, are held in contact with guide plates 18 and 19, respectively, which are mounted on the base 5 parallel to the tie bars 2. Accordingly, the position in the lateral direction of the movable die plate 6 can be finely adjusted by moving the adjustor block 14 and 15 in back or forth directions. The movable die plate 6 the relative position of which has been adjusted in the vertical direction and in the lateral direction in the above-described manner, is moved on the base 5 by the actuation of the die clamping cylinder 4.

The heretofore known die clamping apparatus one example of which has been described above, generally involved the following problems to be resolved:

(1) Generally, in the case of causing movable die plate to advance or retreat while being guided by rollers, as seen in FIGS. 16 to 19, besides the rollers 7 provided at the bottom of the movable die plate 6, normally it further is necessary to provide the guide rollers 16 and 17 on the opposite side surfaces of the movable die plate 6 for the purposes of preventing zig-zag motion thereof during movement, and of adjusting parallelism between the fixed die plate 1 and the movable die plate 6. Accordingly, the guide mechanism requires a large number of parts, and thus there is a tendency that the guide mechanism will be of larger size.

The above-described apparatus shown in FIGS. 16 to 19 is one example of such large-sized guide mechanism in the prior art, wherein guiding of movement of the movable die plate 6 parallel to the plane of the floor is effected by the rollers 7, and restraint of movement within the horizontal plane (prevention of zig-zag motion) is effected by the guide rollers 16 and 17.

(2) On the other hand, whether or not the movable die plate 6 can perform forward and rearward or advance and retreat movements smoothly and precisely is dependent upon the operational precision of the die clamping cylinder 4 for moving the movable die plate 6. In the event that vibration in the vertical direction (rising) of the movable die plate caused by stick-slip and breathing phenomena of the die clamping cylinder 4 is feared, then in addition to the above-mentioned guides, it is necessary to provide another guide for restraining such vibration, will become even and thus the guide mechanism would be more complicated and large-sized.

SUMMARY OF THE INVENTION

The present invention has been developed in view of the above-described technical background, and one object of the present invention is to provide a die clamping apparatus which employs a guide mechanism having a simple structure and yet capable of restraining simultaneously movements in the vertical direction and in the lateral direction, and which can finely adjust the die planes in parallel through a relatively simple operation.

In order to achieve the above-mentioned object, according to one feature of the present invention, in a die clamping apparatus including a fixed die plate for holding a fixed die, a movable die plate for holding a movable die, means for actuating the movable die plate to advance or retreat with respect to the fixed die plate and tie bars for performing a die clamping operation when fixedly coupled to the fixed die plate after the movable die plate has approached to the fixed die plate and the fixed die and the movable die have closed to form a mold, a movable die plate main body and advance/retreat operation guide means on which the movable die plate is mounted are separately formed, and are pin-coupled either nearly at the center or at four locations forwardly and rearwardly and on opposite lateral sides so as to be mutually rotatable.

According to another feature of the present invention, in the above-featured die clamping apparatus, the advance/retreat operation guide is provided with stopper bolts on the left and right of its advance/retreat directions, and rotation of the movable die plate is made adjustable by adjustment of the extent of threading strokes of the respective stopper bolts.

According to the present invention, owing to the above-mentioned structural features the following advantages can be attained:

(1) Owing to the fact that the guide means and the movable die plate are formed separately and they are pin-coupled either nearly at the center or at four locations of the movable die plate, it is possible to rotate only the movable die plate independently of the guide means and thereby fine adjustment of parallelism between the movable die plate and the fixed die plate is achieved relatively easily.

(2) By manipulating the left and right stopper bolts of the advance/retreat operation guide means to adjust the threading strokes of the stopper bolts, rotation of the movable die plate with respect to the advance/retreat operation guide means is effected easily, and the adjustment of the movable die plate can be achieved precisely.

(3) In the case where the movable die plate and the guide means are pin-coupled nearly at the center of the movable die plate, during normal operation the movable die plate and the guide means are operated integrally via the joint pin, but during unsteady operation such as when an abrupt speed change occurs, for instance upon emergency stoppage or when an uneven load to the left and right guide members with respect to the travelling direction is generated, or when a large load or moment is applied to the movable die plate upon the die clamping operation or the like, deformation and forces on the side of the movable die plate will not be directly transmitted to the guide means, and the entire load will not act upon the guide means.

(4) Furthermore, in response to a load in the horizontal direction, the contact planes of the movable die plate and the guide means would displace relatively, and hence an excessive force that would exceed the loading capability of the guide means will not be exterted upon the guide means.

The above-mentioned and other objects, features and advantages of the present invention will become more apparent by reference to the following description of preferred embodiments of the invention taken in conjunction with the accompanying drawings.

Figure 16:
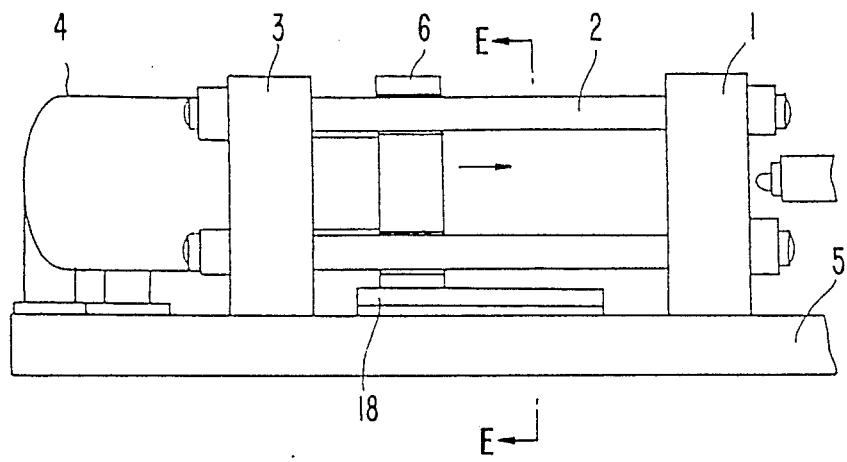
FIG. 16 is a side view of a die clamping apparatus in the prior art.
Figure 17:
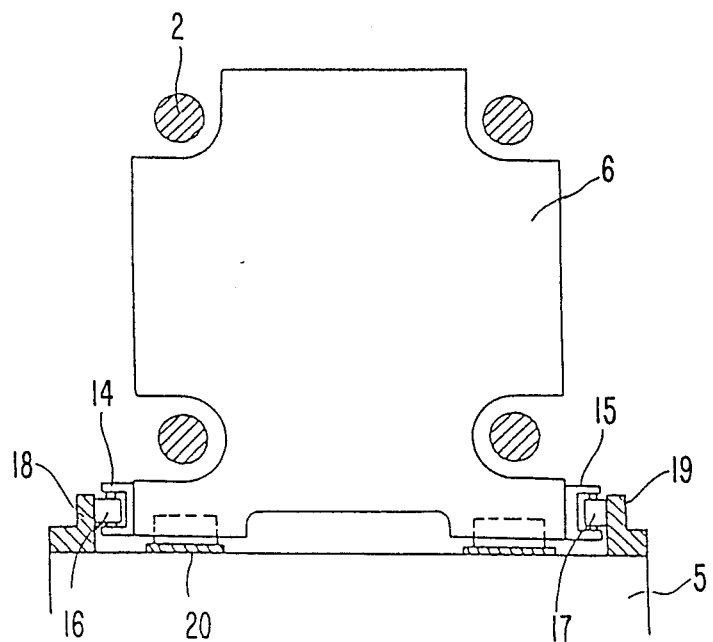
Figure 18:
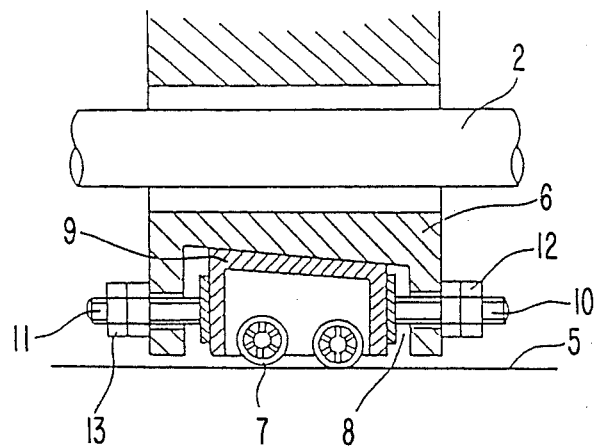
Figure 19:
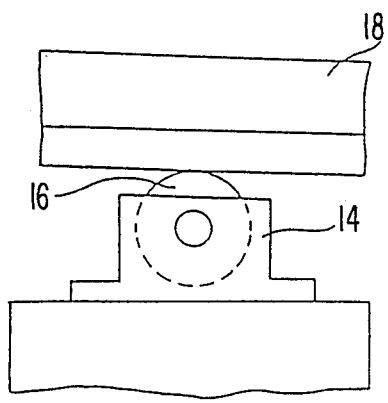

FIG .17 is a cross sectional view taken along line E—E in FIG. 16;

FIG. 18 is an enlarged cross sectional view showing a roller portion in FIG. 16; and FIG. 19 is an enlarged side view of a guide roller portion in FIG. 17.

Figure 1:
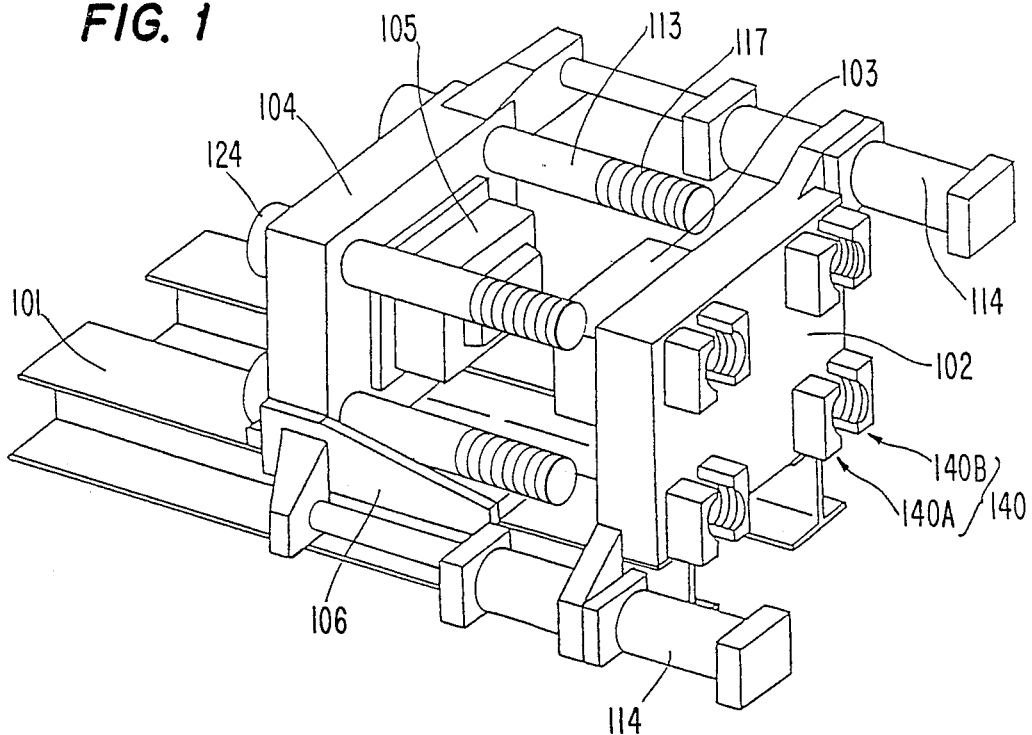
FIG. 1 is a perspective view of an entire die clamping apparatus showing a first preferred embodiment of the present invention.
Figure 8:
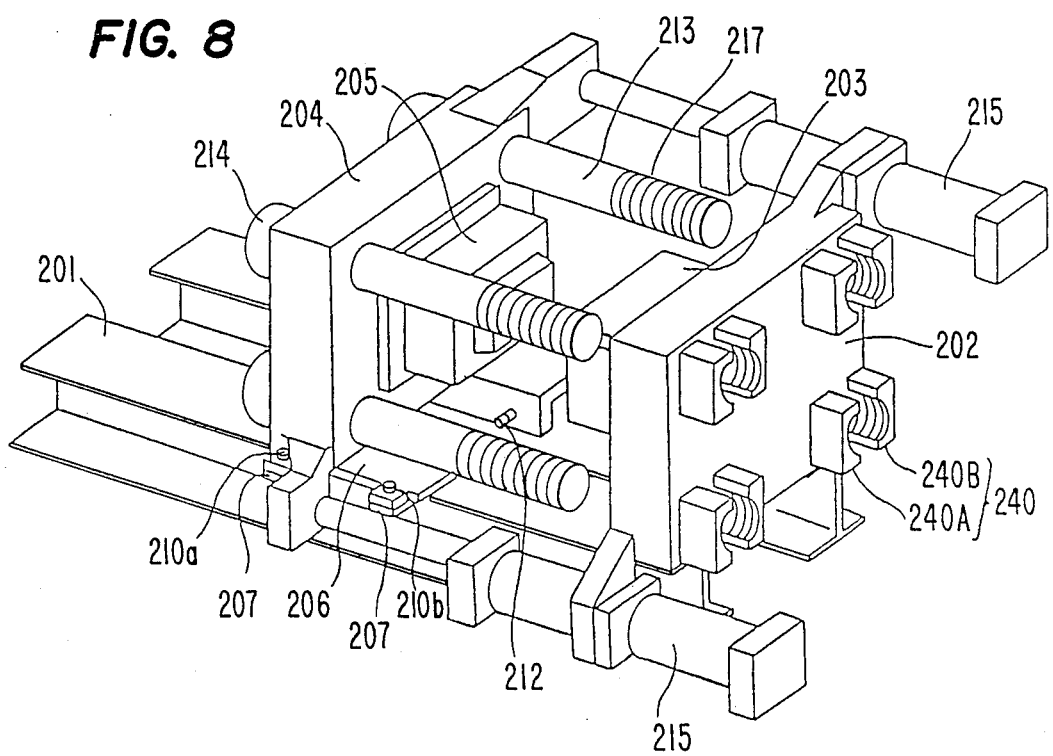
FIG. 8 is a perspective view of an entire die clamping apparatus showing a second preferred embodiment of the present invention.
Figure 2:
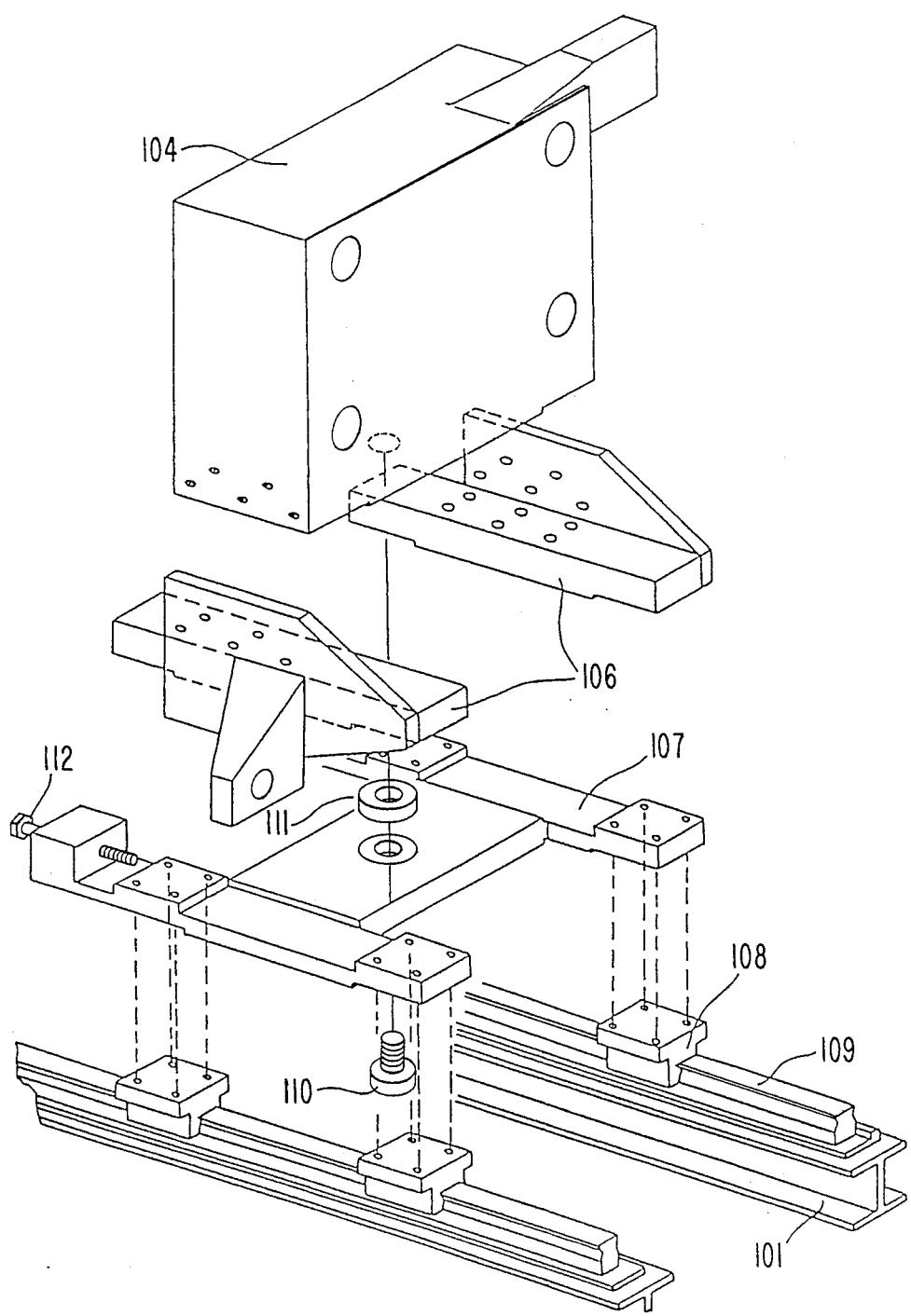
FIG. 2 is an exploded perspective view of a movable die plate and a guide mechanism shown in FIG. 1.

DESCRIPTION OF THE PREFERRED EMBODIMENTS:

Referring now to FIGS. 1 and 2 which show the first preferred embodiment of the present invention, reference numeral 101 designates a base, and at one end of the base 101 is fixedly secured a fixed die plate 102. On the other hand, at the bottom portion of a movable die plate 104, supports 106 elongated in the direction of travelling so as to stably support the center of gravity of the movable die plate 104 are mounted to the left and right lower side portions of the movable die plate 104, and the assembly of elements 104, 106 is mounted on the base 101 via a guide mounting plate 107, guide blocks 108 and guide rails 109 so as to be movable in the back and forth directions.

To the opposed surfaces of the fixed die plate 102 and the movable die plate 104 are mounted a fixed die 103 and a movable die 105, respectively.

The basic structure of each support 106 includes a rectangular bottom plate having steps on its lower surface and a side plate fixedly secured to one side surface of the bottom plate as shown in FIG. 2, and in order to support the movable die plate 104 in a self-standing state the supports 106 are fixedly secured to the left and right lower side surfaces of the bottom portion of the movable die plate 104 as described above.

The above-mentioned guide mounting plate 107 has the structure shown in FIG. 2, that is, generally it has an H-shaped configuration as viewed in plan, upper surfaces of the respective leg portions thereof are formed steps corresponding to the steps formed on the lower surfaces of the above-mentioned supports 106. Thus, the lower surfaces of the supports 106 are mounted on the upper surfaces of the leg portions. Guide blocks 108 are mounted to the lower surfaces at the four corners of the guide mounting plate 107. The above-described guide mounting plate 107 is less rigid than the supports 106.

The guide blocks 108 are positioned on the guide rails 109, and they are formed as linear motion type guides that move in opposite rectilinear directions along rails 109 but are restrained from movement relative thereto vertically or laterally.

Figure 6:
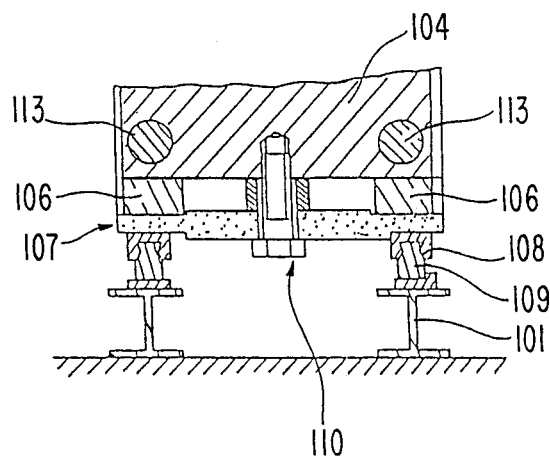
FIG. 6 is a cross sectional taken along line B—B in FIG. 5.

Reference numeral 110 designates a center pin which connects the nearly central portion of the above-mentioned guide mounting plate 107 and the nearly central portion of the bottom surface of the movable die plate 104 with a spacer 111 interposed therebetween. As shown in FIG. 6, this center pin 110 penetrates a through-hole, formed nearly at the center of the guide mounting plate 107 and having a somewhat larger inner diameter than the outer diameter of the center pin 110, and is threadedly engaged with the movable die plate 104. Furthermore, to the left and right rear ends of the guide mounting plate 107 are mounted stopper bolts 112 that are arranged to have screwed tip ends that may butt against the leg portions of the movable die plate 104.

The guide rails 109 are fixedly secured to the left and right upper surfaces of the base 101, to form guide surfaces for the advance/retreat movements of the movable die plate 104.

Reference numeral 113 designates tie bars that are fixedly secured by nuts 124 to the movable die plate 10 and extend therethrough, and at the tip end portions of tie bars 113 are formed screw threads 117 to be meshed with half-nuts 140 as will be described later.

Between the fixed die plate 102 and the movable die plate 104 are mounted mold opening/closing cylinders 114 so as to move the movable die plate 104 back and forth.

Now description will be made of a die clamping pressure booster mechanism used in the illustrated embodiment.

Figure 7:
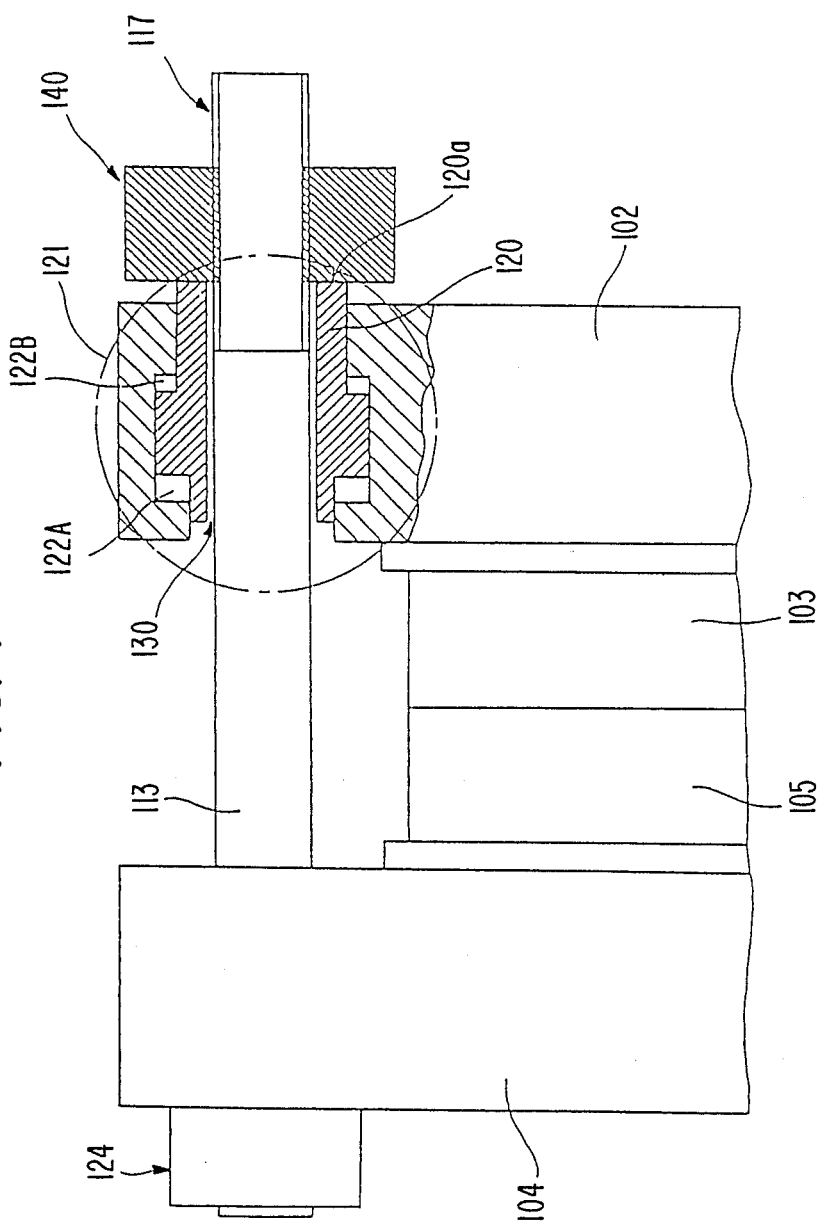
FIG. 7 is a detailed cross sectional view showing one practical example of a hydraulic cylinder that can be employed according to the present invention.
Figure 9:
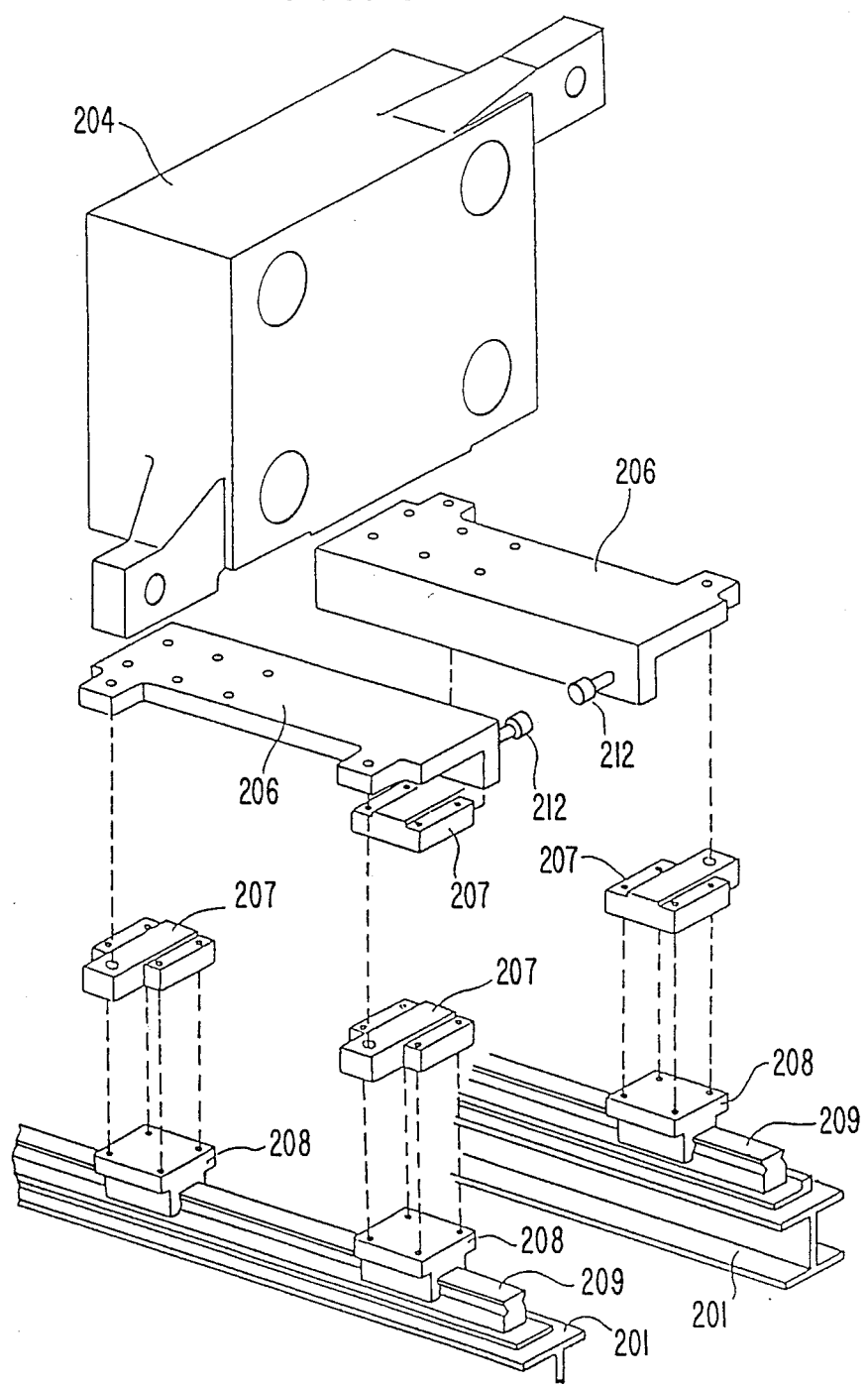
FIG. 9 is an exploded perspective view of a movable die plate and a guide mechanism shown in FIG. 8.

FIG. 7 shows this pressure booster mechanism, in which a hydraulic cylinder 121 is contained within each of the portions of the fixed die plate 102 opposed to the tie bars 113. Upon boosting the die clamping pressure, by feeding pressurized oil to an oil chamber 122A, a ram or piston 120 within the hydraulic cylinder 121 is moved rightwards as viewed in FIG. 7. At its tip end portion 120a the ram 120 pushes against the half nut 140 which is in threaded engagement with the screw threads 117 of the tie bar, thereby generating a die clamping force.

The ram 120 has extending therethrough a tie bar penetrating hole 130, and upon clamping dies the tie bar 113 extends through penetrating hole 130 and meshes by its screw threads 117 with the half nut 140.

The half nut 140 is a nut divided into left and right halves and is mounted on the backside of the fixed die plate 102 when the screw threads 117 of the tie bar meshes with the half nut 140 and a die clamping force is exerted on the half nut 140 by the ram 120, the dies are clamped together.

Now the operation of the above-described construction will be explained.

When pressurized oil is fed into rod-side oil chambers in the mold opening/closing cylinders 114, the movable die plate 104 travels towards the fixed die plate 102 while being guided by the guide rails 109. The tip-ends of the tie bars 113 pass through the tie bar penetrating holes 130 in the fixed die plate 102, and the movable die plate 104 stops at a position where the fixed die 103 and the movable die 105 are abutted together.

Each half nut 140 disposed on the backside of the fixed plate 102 is moved by a minute amount for adjustment in the direction of travelling of the tie bar, depending on the thickness of the dies, and thus it is positioned by an adjusting device (not shown) in a position where it can be meshed with the screw threads 117 of the tie bar.

Simultaneously with the joining of the dies, the left and right half nut pieces 140A and 140B (FIG. 1) are closed by an opening/closing device (not shown). Subsequently by feeding pressurized oil into oil chamber 122A on the left side as viewed in FIG. 7 of the ram 120, the ram 120 is moved rightwards, and thus it pushes the half nut 140 rightwards with its tip end portion 120a and thereby generates a die clamping force.

When moldinng has finished and the mold is to be opened, the pressure in the left side oil chamber 122A is lowered, then the half nut 140 is opened by means of the opening/closing device therefor (not shown). Thereafter and thereafter pressurized oil is fed into the head side oil chambers of the mold opening/closing cylinders 114 and the movable die plate 104 is moved leftwards in FIG. 7 to open the mold.

In a die clamping apparatus in an injection molding machine or the like which repeats the above-described operation, the movable die plate 104 is placed on the base 101, and it is connected to the fixed die plate 102 by the intermediary of one or more mold opening/closing cylinders 114 and performs die opening/closing operations, that is advance/retreat movements. In such an apparatus, the parallelism between the die mounting planes of the movable die plate 104 and the fixed die plate 102 is extremely important. Accordingly, to the present invention it is contemplated that this parallelism can be adjusted by rotating the movable die plate 104 about the center pin 110 via the guide mounting plate 107 by adjusting the left and right stopper bolts 112 which butt against the leg portions of the movable die plate 104.

Though the movable die plate 104 is connected with the mold opening/closing cylinders 114, precision of the operation is determined by the structure of the guide mechanism for its leg portions. An abrupt speed change during movement of the movable die plate 104 including emergency stoppage, would result in application of a forwardly or backwardly tilting force to the movable die plate 104 upon clamping of the dies, a backwardly tilting force directed in the direction of pulling the movable die plate 104 towards the fixed die plate 102 is exerted upon the movable die plate 104 from the ram 120 via the tie bars 113. Furthermore, if the force generated by the mold opening/closing cylinders 114 is in such an unbalanced condition that it produces a torque, then there is a tendency that a force tending to cause zig-zag motion of the movable die plate 104 (a force directed in the horizontal direction) is applied to the guide mechanism.

If it is contemplated that the guide mechanism directly bear these forces directed in the vertical direction and in the horizontal direction then it is necessary that there be provided guide members both for the upward and downward directions and for the leftward and rightward directions and that there be provided a load bearing capability that can be adapted to all possible situations. In such case it is inevitable that the guide mechanism would be considerably large-sized and complicated.

In order to avoid such situation, according to the present invention there is provided a guide mechanism of such construction that it has a load bearing capability both in the vertical direction and in the horizontal direction.

In the illustrated embodiment, provision is made such that the movable die plate 104 and the guide mounting plate 107 are coupled only via the center pin 110, and the weight of the movable die plate 104, the movable die 105 and the like as well as the internal force during movement of the movable die plate 104 are transmitted via the surface contact between the supports 106 and the guide mounting plate 107.

Figure 3:
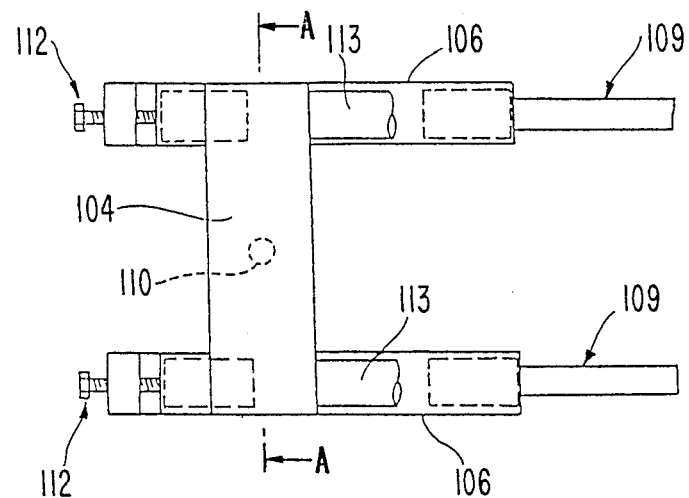
FIG. 3 is a top view thereof.
Figure 4:
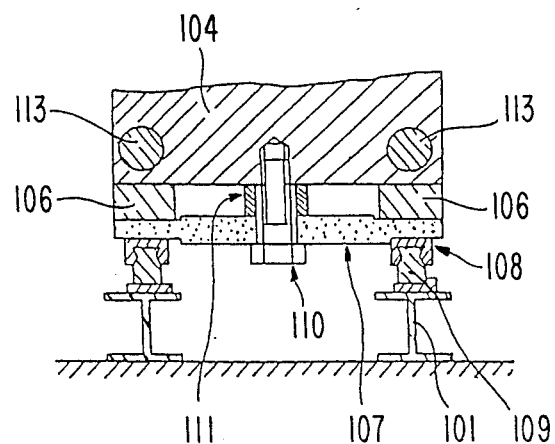
FIG. 4 is a cross sectional view taken along line A—A in FIG. 3.
Figure 5:
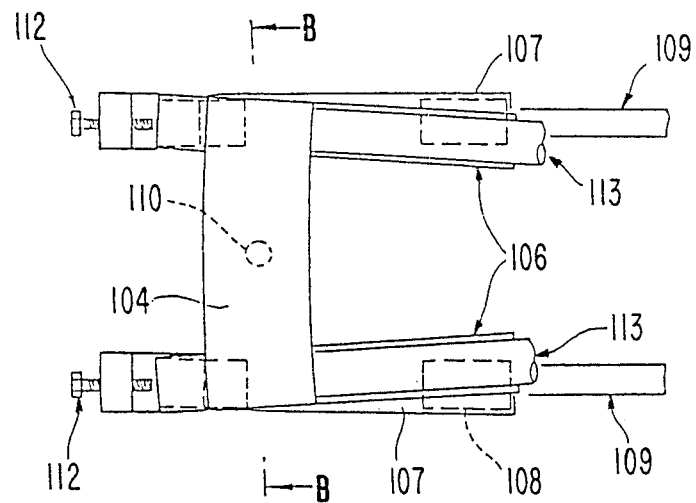
FIG. 5 is a top view showing a condition of a guide mechanism upon deformation of a movable die plate.

Accordingly, even in the illustrated embodiment, when the movable die plate 104 is moving in a steady state the movable die plate 104 and the guide blocks 108 would smoothly advance and retreat as if they are integrally fixed together via the supports 106 and the guide mounting plate 107 as shown in FIGS. 3 and 4.

However, in the event that a force tending to cause zig-zag motion of the movable die plate 104 acts upon the movable die plate 104 in the horizontal direction, the supports 106 will move in the lateral direction on the guide mounting plate 107 within the limit of the clearance about the center pin 110 in the through-hole, and thereby this force is prevented from acting upon the guide mechanism.

In addition, when a forwardly tilting force or a backwardly tilting force is exerted upon the movable die plate 104, owing to the fact that the movable die plate 104 and the guide mounting plate 107 are coupled via the pin 110, the front end portion or the rear end portion of each support 106 can deform in the direction of separating from the guide mounting plate 107 independently of the guide mounting plate 107, and thus the contact pressure between these members is reduced. Furthermore, since the rigidity of the guide mounting plate 107 is assumed to be small as described previously, the force generated by the deformation of the guide mounting plate 107 caused by the deformation of the support 106 also is small. Consequently, it can be prevented that an excessive force acts upon the guide mechanism due to a forwardly tilting force or a backwardly tilting force acting on the movable die plate 104.

It is to be noted that in the above-described guide block 108, while a linear motion type bearing in which a plurality of rollers or balls are assembled (a rolling type bearing) is useful for assembling the block in a compact form, as a matter of course, a slide guide surface could be employed without any inconvenience.

A second preferred embodiment of the present invention is illustrated in FIGS. 8 to 15, in which reference numeral 201 designates a base, numeral 202 designates a fixed die plate, and the fixed die plate 202 is fixedly secured to one end of the base 201 and has a fixed die 203 mounted thereon. Reference numeral 204 designates a movable die plate having a movable die 205 mounted thereon. To leg portions of the movable die plate 204 on the left and right sides thereof, are mounted supports 206 elongated in the direction of travel on so as to stably support the center of gravity of movable die plate 204. Supports 206 are mounted on the base 201 via guide mounting plates 207, guide blocks 208 and guide rails 209. The supports 206 are fixedly secured to left and right leg portion of the movable die plate 204 in order to support the movable die plate 204. In addition, each guide mounting plate 207 has a guide block 208 mounted thereto. Each guide block 208 is placed on a guide rail 209, and hook-shaped projections at the bottom of the guide block 208 are engaged with grooves of the guide rail 209 directed in the lengthwise direction thereof, so that during advance and retreat movements the guide blocks 208 and the guide rails 209 jointly form a linear motion type guide which can restrain motions both in the vertical direction and in the lateral direction. The guide rails 209 are fixedly secured onto the left and right top surfaces of the base 201, and they serve as guide surfaces for advance and retreat movements of the movable die plate 204.

Reference numerals 210a and 210b designate connecting pins for interconnecting the guide mounting plates 207 with the supports 206, and they are provided two on each side. Each connecting pin 210a located on the left side as viewed in FIG. 8 that is, on the side farthest from the fixed die 203, is fitted in the respective guide mounting plate 207 and support 206 with a high precision of aligment, that is, the connecting pin 210a is fitted in both these members in such manner that relative movement in the horizontal direction between the guide mounting plate 207 and the support 206 will be small. Each of the other connecting pins 210b is somewhat loosely fitted in its respective members in such manner that the relative movement in the horizontal direction between the guide mounting plate 207 and the support 206 may be large. Reference numeral 212 designates stopper bolts that are respectively mounted to the tip end portions of the left and right supports 206 and serve as push bolts having their threaded tip ends butted against corresponding of the guide mounting plates 207. Reference numeral 213 designates tie bars which are fixedly secured to the movable die plate 204 by means of nuts 204, and which at free end portions thereof are formed with screw threads 217 to be meshed with respective half nuts 240. Reference numeral 215 designates mold opening/closing cylinders that are mounted between the fixed die plate 202 and the movable die plate 204 and serve to move the movable die plate 204 in advance and retreat directions. The screw threads 217 are adapted to be meshed with half nuts 240 disposed on the backside (the side opposite to the die mounting surface) of the fixed die plate 202, and are provided at the tip end portions of the tie bars 213. Reference numeral 219 designates a hydraulic cylinder for boosting a die clamping pressure that is contained within the fixed die plate 202. Reference numeral 220 designates a ram or piston which is moved rightwards as viewed in FIG. 15 by feeding pressurized oil into an oil chamber 222A upon boosting the die clamping pressure, and which pushes at its tip portion 221 against a respective half nut 240 that already has been held in meshed condition with the screw threads 217 of the respective tie bar 213, to generate a die clamping force. Numeral 222B designates an opposite oil chamber in the hydraulic cylinder 219. Reference numeral 230 designates a tie bar penetrating hole which extends through the ram 220 and through which is inserted the tie bar 213 in order to be meshed with the half nut 240 upon clamping of the dies. The half nut 240 is a nut divided into two pieces, that is, into left and right members 240A and 240B, which are closed by means of an opening/closing mechanism (not shown) upon clamping of the dies, and thus meshed with the screw threads 217 of the tie bar 213, and which generates a die clamping force when pushed by the ram 220.

Now description will be made of the operation of the second preferred embodiment of the present invention constructed in the above-described manner. When pressurized oil is fed into rod-side oil chambers in the mold opening/closing cylinders 215, the movable die plate 204 travels towards the fixed die plate 202 while being guided by the guide rails 209, the tip ends of the tie bars 213 pass through the tie bar penetrating holes 230 in the fixed die plate 202, and stops at a position where the fixed die 203 and the movable die 205 abut together. At this moment, the half nuts 240 provided on the backside of the fixed die plate 202 already have been adjusted in position by means of an adjusting device not shown, up to positions where they can mesh with the screw threads 217, by adjustably moving the half nuts 240 by a minute amount in the direction of travelling of the tie bars, depending on the thickness of the dies. When the dies have been joined in the above-described manner, the left and right members 240A and 240B of the half nuts 240 are closed by means of an opening/closing device (not shown). Subsequently by feeding pressurized oil into the oil chamber 222A on the left side of each ram 220, the ram 220 is moved rightwards, and it pushes at its tip end portion 221 the above-mentioned half nut 240 rightwards and thereby generates a die clamping force.

When molding has been finished and the mold is to be opened, the oil pressure in the oil chamber on the left side of the ram 220 is lowered, then the half nut 240 is opened by means of the opening/closing device therefor (not shown), and thereafter when pressurized oil is fed into the head side oil chambers in the mold opening/closing clinders 215, the movable die plate 204 moves leftwards and the mold is opened.

In a die clamping apparatus in an injection molding machine or the like which repeats the above-mentioned operation, the movable die plate 204 is placed on the base 201, and it is connected to the fixed die plate 202 by the intermediary of one or more mold opening/closing cylinders 215 and performs the opening/closing movements, that is, advance/retreat operations. In such an apparatus, the parallelism between the die mounting planes of the movable die plate 204 and the fixed die plate 202 is extremely important. According to the present invention, this parallelism can be adjusted by rotating the movable die plate 204 by some amount as a result of relative displacement between each support 206 and the respective guide mounting plate 207, by adjusting the stopper bolts 212 provided at the tip ends of the left and right supports 206 fixed to the leg portion of the movable die plate 204.

Figure 14:
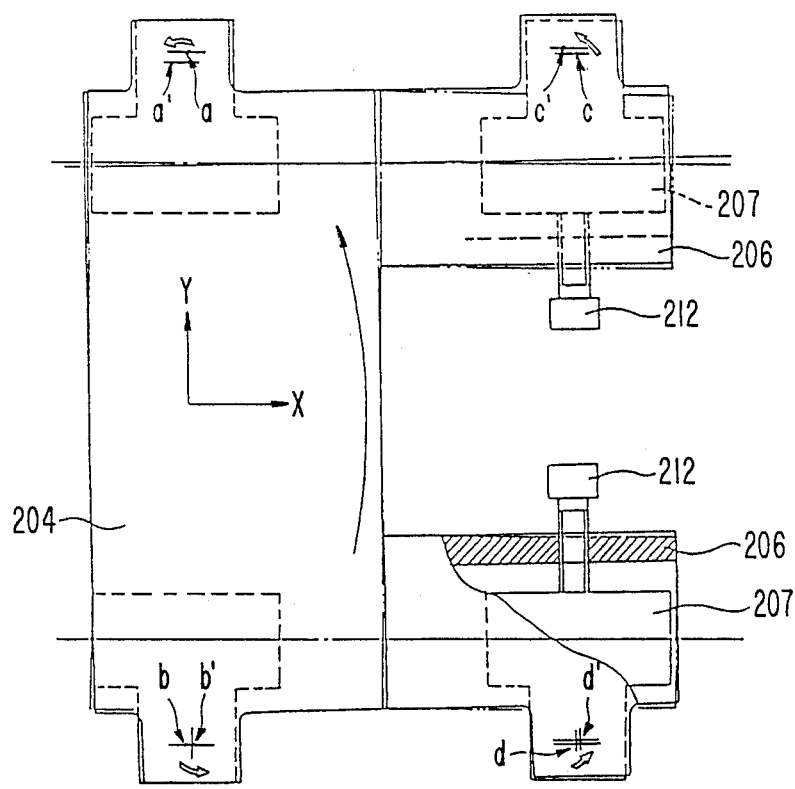
FIG. 14 is a schematic view showing rotation of the movable die plate by means of the push bolts shown in FIG. 12, to enable adjustment for parallelism between die mounting planes.
Figure 15:
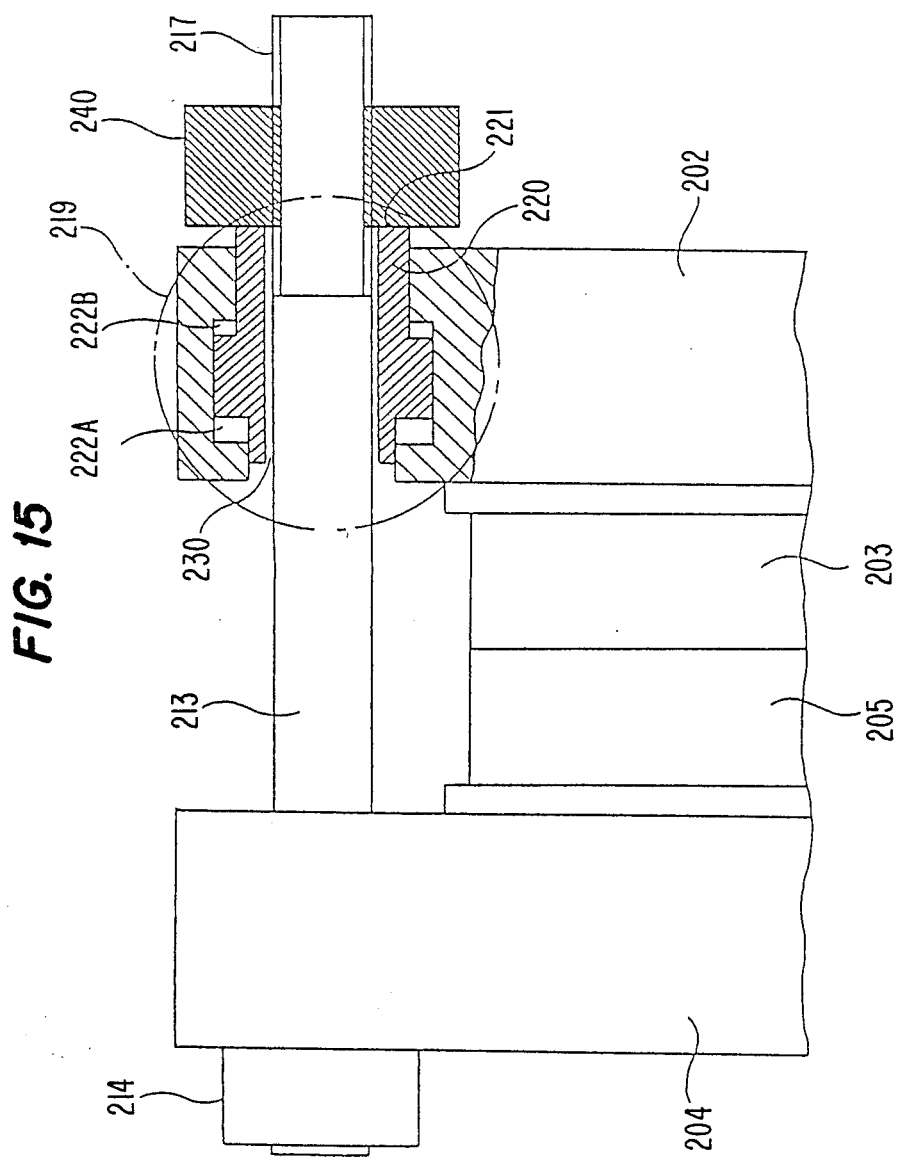
FIG. 15 is a side view partly in cross-section showing a coupling condition between a screw and a nut shown in FIG. 8.

More particularly, as specifically shown in FIG. 14, by fastening and loosening the left and right stopper bolts 212, respectively, or vice versa, the movable die plate 204 can be rotated by some amount. FIG. 14 shows the state where the stopper bolt 212 on the side depicted partly in cross-section has been tightened and the other stopper bolt 212 has been loosened (movement from the state depicted by solid lines to the state depicted by double-dot chain lines). Initial pin-connected positions of pins 210a, 210b a, b, c and d are rotationally shifted to positions a', b', c' and d', respectively. At this time, the movements a→a' and b→b' of the connecting pins 210a on the respective sides are movements almost entirely in the direction of X-axis only, compared to movements in the direction of the Y-axis, because the connecting pins 210a are fitted in the guide mounting plates 207 and the supports 206 with a high precision of alignment. This means that the guide mounting plates 207 are merely displaced in the direction of the X-axis jointly with the guide blocks 208 and there is no substantial displacement of the pin-connected positions. However, in the movement c→c' and d→d' of the connecting pins 210b on the respective sides, since these connecting pins 210b are loosely fitted in the guide mounting plates 207 and the supports 206, greater movement is effected in the direction of the Y-axis than in the direction of the X-axis. As described above, it is necessary that the pin-connections at the points a and b be of high precision, but the pin-connections at the points c and d are somewhat loose fitting so that they can be adapted to predetermined rotational adjustment.

Figure 10:
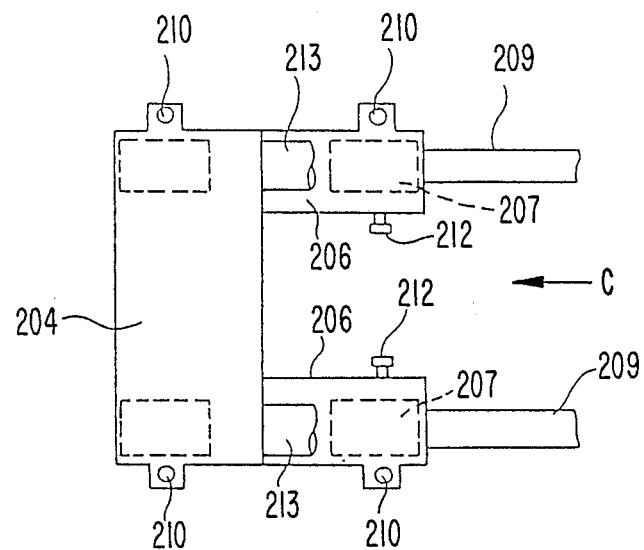
FIG. 10 is a plan view of the movable die plate and the guide mechanism in FIG. 8.
Figure 11:
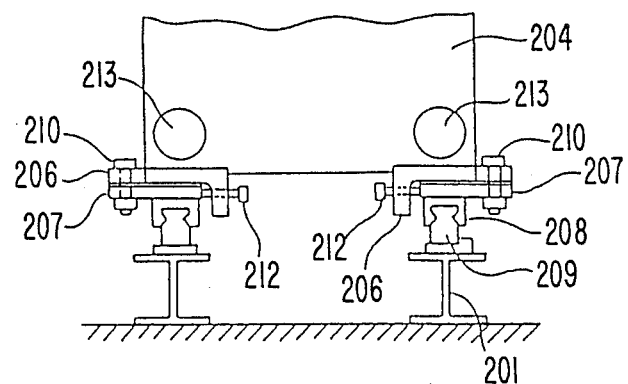
FIG. 11 is a side view as viewed in the direction of arrow C in FIG. 10.
Figure 12:
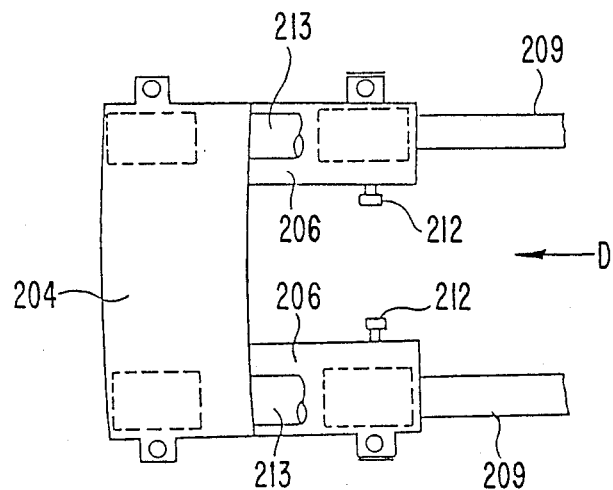
FIG. 12 is a plan view showing the movable die plate in a deformed (wrapped) state as compared to the state shown in FIG. 10.
Figure 13:
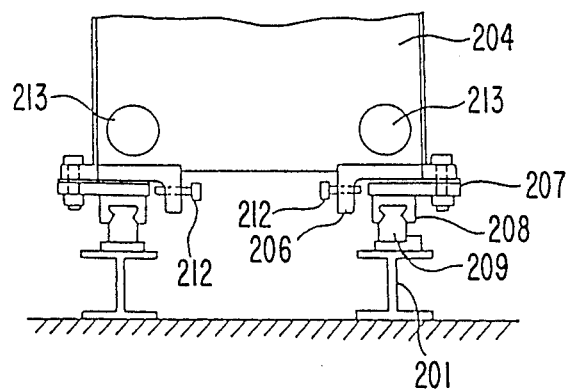
FIG. 13 is a side view as viewed in the direction of arrow D in FIG. 12.

FIGS. 10 to 13 are schematic views to be referred to for explaining another effect of the stopper bolts 212. In the event that a torque tends to act upon the movable die plate 204 due to any operation, the tip ends of the two stopper bolts 212 would oppose such torque (FIGS. 10 and 11). In addition, when deformation as shown in FIGS. 12 and 13 is applied to the movable die plate 204, relative displacement would occur between the supports 206 and the guide mounting plate 207. Hence the tip ends of the stopper bolts 212 would separate from the guide mounting plates 207. Accordingly, it can be preliminarily avoided that a large load directed in the lateral direction is applied to the guide blocks 208. It is to be noted that while the above-described guide block 208 can be assembled in the most compact form if it is formed as a linear motion type bearing in which a plurality of sets of rollers or balls are assembled (a rolling type), as a matter of course, a sliding guide surface could be employed without any inconvenience.

As described in detail above, the present invention can provide the following effects and advantages:

(1) In the above-described guide mechanism, owing to the fact that the movable die plate and the guide mounting plate having the guide blocks mounted thereto are formed as separate bodies and then are pin connected so as to be able to rotate relatively, the movable die plate can be adjusted so as to have parallelism with respect to the fixed die plate by rotating the movable die plate with respect to the guide mounting plate. In addition, an excessive load caused by an unsteady operation of the movable die plate will not be directly applied to the guide, and thus the load capacity of the guide can be made small.

(2) Adjustment for parallelism between the movable die plate and the fixed die plate can be achieved relatively easily by means of the stopper bolts provided in the left and right guide sections.

While the principle of the present invention has been described above in connection with preferred embodiments of the invention, it is intended that all matter contained in the above description and illustrated in the accompanying drawings shall be interpreted to be illustrative and not in a limiting sense.

What is claimed is:

1. In a die clamping apparatus including a fixed die plate for holding a fixed die, a movable die plate for holding a movable die, means for actuating said movable die plate to advance or retreat with respect to said fixed die plate, guide means guiding advance and retreat movements of said movable die plate, and tie bars for performing a die clamping operation by being fixedly coupled to said fixed die plate after said movable die plate has moved toward said fixed die plate and the fixed die and the movable die have closed to form a mold, the improvement wherein:
    said movable die plate and said advance/retreat movement guide means are separately formed, and are pin-coupled together so that said movable die plate is rotatable relative to said guide means.

2. The improvement claimed in claim 1, wherein said movable die plate and said advance/retreat movement guide means are pin-coupled together substantially at the center of said movable die plate.

3. The improvement claimed in claim 1, wherein said advance/retreat movement guide means are disposed on opposite lateral sides of said movable die plate and are pin-coupled thereto at four locations forwardly and rearwardly and on opposite lateral.

4. The improvement claimed in claim 1, wherein said advance/retreat movements guide means includes adjustable stopper bolts on opposite lateral sides relative to the advance/retreat directions, and relative rotation of said movable die plate is made adjustable by adjustment of said stopper bolts.

5. The improvement claimed in claim 2 wherein said advance/retreat movement guide means includes adjustable stopper bolts on opposite lateral sides relative to the advance/retreat directions, and relative rotation of said movable die plate is made adjustable by adjustment of said stopper bolts.

6. The improvement claimed in claim 3, wherein said advance/retreat movement guide means includes adjustable stopper bolts on opposite lateral sides relative to the advance/retreat directions, and relative rotation of said movable die plate is made adjustable by adjustment of said stopper bolts.

* * * * *